June 20, 1933.  D. W. BLAKESLEE  1,915,047
METHOD OF ELECTRIC WELDING
Filed Oct. 29, 1930
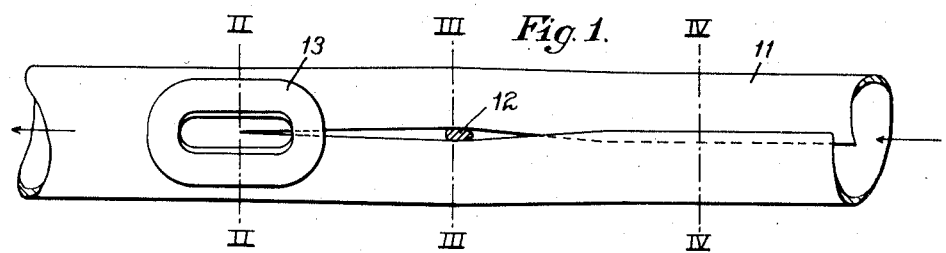
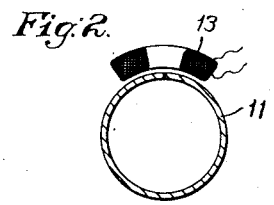
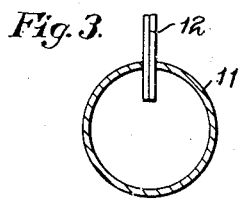
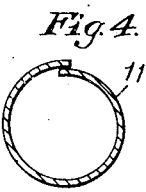
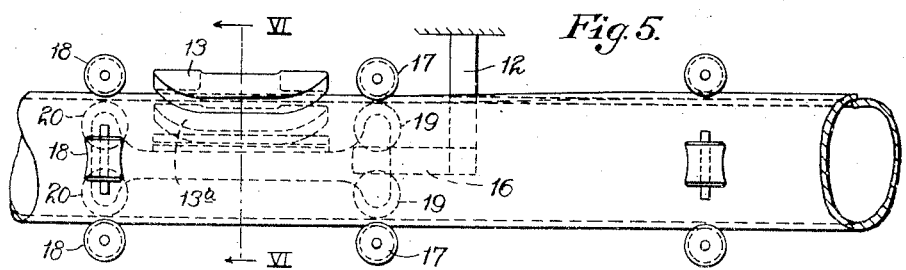
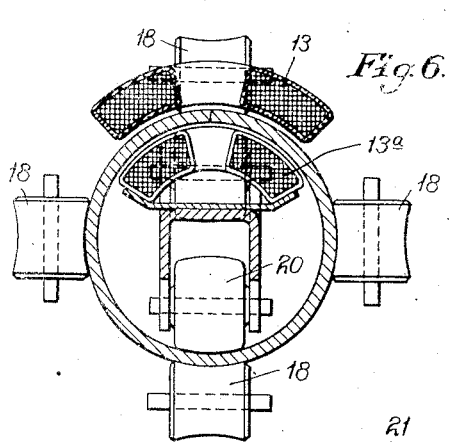
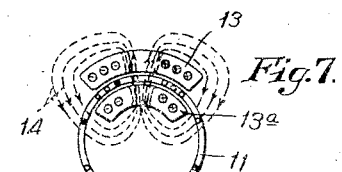
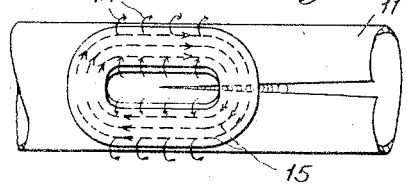
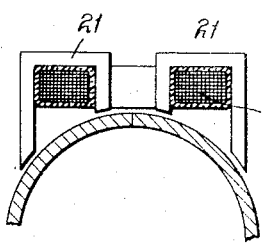
INVENTOR
Doral W. Blakeslee,
By Archworth Martin,
Attorney.

Patented June 20, 1933

1,915,047

UNITED STATES PATENT OFFICE

DORAF W. BLAKESLEE, OF PITTSBURGH, PENNSYLVANIA

METHOD OF ELECTRIC WELDING

Application filed October 29, 1930. Serial No. 491,985.

My invention relates to a method of and apparatus for electric welding, and more particularly to the welding together of edges of metal sheets, pipe welding, etc.

My invention is directed to the operation of welding by the use of alternate current induction, as distinguished from what is known as the resistance welding method, wherein current flows through the material by direct electrical contact.

One object of my invention is to provide a means and a method whereby an effective weld is secured in a generally improved and simplified manner.

Another object of my invention is to provide a means and a method whereby a flow of current is induced in the material to be welded and arcs formed across the surfaces to be brought into contact, for the purpose of preheating and softening the metal at the desired locations.

Another object of my invention is to provide a means and a method for concentrating the lines of the induced magnetic circuit and the induced secondary electrical circuits in the vicinity of the line of weld.

Some of the means by which my invention may be practised are shown in the accompanying drawing, wherein Figure 1 is a plan view of a portion of the apparatus with a tubular skelp or blank in place; Figs. 2, 3 and 4 are sectional views taken on the lines II—II, III—III, and IV—IV respectively of Fig. 1; Fig. 5 is a side elevational view of another form of apparatus; Fig. 6 is a sectional view taken on the line VI—VI of Fig. 5; Figs. 7 and 8 are cross sectional and plan views in diagrammatic form showing the directions of current flow and magnetic flux at a given instant, and Fig. 9 shows another modification.

Referring first to Figs. 1 to 4, I show a pipe blank or skelp 11 that has relative movement with respect to a coil 13, in the direction indicated by the arrow, by suitable means such as traction feed or guide rollers to be hereinafter described, or may be drawn along its path of travel by tongs in a manner well-known in the art. The preformed skelp 11 may be held stationary and traversed by the welding equipment moving in the direction opposite to the arrow.

The skelp when brought to the welding apparatus has its edges overlapped somewhat after the manner of lap weld pipe, as shown at the right hand end of Fig. 1, and in Fig. 4. A spreader bar 12 is utilized to spread the edges of the skelp apart as it advances toward an electrical coil 13. The spreader bar is so located relative to the coil 13 as to secure the desired angle of approach between the edges of the skelp. The edges of the skelp are brought into circumferential alinement with one another by means of guide rollers as shown in Fig. 5, and permitted to spring into contact with one another by the inherent resiliency of the metal of the skelp, or forced into contact with one another, when passing the coil 13.

This resiliency or yieldability of the skelp results, of course, from the strain imposed on the metal through the forcing of the edges thereof out of overlapping relation. This strain which causes the edges to spring into contact with one another after passing the spreader 12 results in the effecting of a better and more uniform weld for various reasons, one of which is that in heating the edges of the skelp to welding temperatures an effect is produced that is termed "thermal growth" or a swelling of the metal which tends to force the edges apart, which tendency is counteracted by the strain referred to. Also, the welding may be performed at a faster rate. Another advantage is that the skelp can be welded clear to its rear end, since after the blank is entirely past the spreader 12, the edges will still have this strained engagement with one another when passing through the welding zone.

The coil 13 may consist of water-cooled copper tubing, or other conductors and forms part of a primary circuit which is energized from a source of alternating current of high frequency and which, for example, may be from 900 to 1200 cycles, although this frequency may, of course, be changed to suit conditions. Low frequency current, for example, down to 60 cycles may be utilized when a physical magnetic circuit is provided, as in Fig. 9. The alternating current which is passed through the coil 13 produces lines of magnetic force about the primary circuit, which pass approximately perpendicularly through the material being welded, as indicated by the lines 14 in Figs. 7 and 8, and therefore induces a flow of current in the pipe 11 along paths indicated generally by lines 15.

It will be seen that the induced current flows in a direction generally parallel to but across the seam line of the pipe, and that as the edges of the pipe in a portion of the secondary circuit are spaced slightly apart, arcing will take place across the gap between the spaced edges, thus heating the metal at the edges to a molten or semi-molten condition. While the induced current, of course, tends to flow through paths of least impedance, the position of the coil with respect to the gap between the edges of the skelp is such that the flow of the induced current adjacent to one end of the coil must necessarily be across the gap, thereby causing arcing between the edges of the skelp.

The induced current cannot flow circumferentially of the pipe because the induced lines of flow at opposite sides of the line of weld are in opposite directions, so that if the current lines tend to extend to a point near the diametrically opposite side or bottom of the pipe they will oppose and repel one another.

Furthermore, the flow of induced current will be mainly in the vicinity of the line of weld. The primary coil is kept as close as possible to the pipe and the line of the seam, so that the induced current under the coil raises the temperature of the metal near the weld, and there is therefore a relatively small difference of temperature between the arcing edges of the pipe and the adjacent material thereof, with consequent lower energy loss by heat conduction. The weld may therefore be more rapidly and effectively made.

While Fig. 1 shows a primary coil 13 exteriorly of the pipe, I may also mount a primary coil 13a interiorly of the pipe, supporting it on a bracket-like extension 16 from the spreader bar member 12. The coil 13a functions in a manner similar to and assists the coil 13, thereby making it possible to weld the pipe more rapidly and efficiently than if only one primary coil were employed. Furthermore, should there be a tendency for the coil 13 to blow molten metal through the seam to the interior of the pipe, such tendency will be counteracted by the interior coil 13a. Suitably-mounted guide rollers 17 and 18 are positioned exteriorly of the pipe, and cooperating guide rollers 19 and 20 are positioned interiorly thereof. The guide rollers 17 and 19 bring the edges of the skelp into circumferential alinement after they have been spread apart by the guide bar 12, and the guide rollers 18 and 20 continue to maintain the pipe in proper shape until after the welded metal has become cooled.

From the foregoing it will be seen that no laminated steel or other physical magnetic circuit is required for the magnetic flux or lines of force of the excited primary circuit, and there is no flow of current circumferentially of the pipe, and that the positioning of the coil is such as to concentrate the magnetic field near the line of weld.

Referring to Fig. 9, I show an arrangement wherein the primary coil 13b is not bent to conform to the contour of the pipe, but wherein the flux lines of the primary circuit are directed into proximity to the pipe for the purpose of inducing a flow of current therein without excessive losses. To this end, I provide laminated steel yokes 21, having leg portions that extend into proximity to the wall of the pipe for the purpose of offering a path of less reluctance for directing the flux lines of the primary circuit. Such yokes, of course, may be employed with the coils 13 and 13a, if desired.

I claim as my invention:—

1. The method of electrically welding tubing, which comprises preforming the tube with overlapped edges, relatively moving the tube through an alternating magnetic field to cause electric current to be induced therein and flow across the unwelded seam of the tubing, spreading the overlapped edges of the tube at a point in advance of said field, whereby the said edges are disposed in angular relation when entering the said field, applying pressure to the edges of the tubing to move them into a common plane, and causing the said edges to move into abutting engagement with each other at a point within said field by the resiliency of the tubing.

2. The method of forming tubes, which comprises bending a metal blank to form a skelp whose edges overlap, moving the skelp past a heating element to effect softening of said edges, and simultaneously spreading the edges of the skelp apart, at a point in advance of the welding zone, to permit said edges to be brought into circumferential alinement and to yieldably engage one another when in the welding zone.

In testimony whereof I, the said DORAF W. BLAKESLEE, have hereunto set my hand.

DORAF W. BLAKESLEE.